US009158016B2

(12) United States Patent
Chiu et al.

(10) Patent No.: US 9,158,016 B2
(45) Date of Patent: Oct. 13, 2015

(54) MULTI-DIMENSIONAL DATA RECONSTRUCTION CONSTRAINED BY A REGULARLY INTERPOLATED MODEL

(75) Inventors: Stephen KamLing Chiu, Katy, TX (US); Phil Dean Anno, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 392 days.

(21) Appl. No.: 13/564,195

(22) Filed: Aug. 1, 2012

(65) Prior Publication Data

US 2013/0286041 A1    Oct. 31, 2013

Related U.S. Application Data

(60) Provisional application No. 61/640,508, filed on Apr. 30, 2012.

(51) Int. Cl.
*G09G 5/00* (2006.01)
*G01V 1/28* (2006.01)
*G01V 1/36* (2006.01)

(52) U.S. Cl.
CPC .. *G01V 1/28* (2013.01); *G01V 1/36* (2013.01); *G01V 2210/57* (2013.01)

(58) Field of Classification Search
CPC ....... G06T 3/4007; G06T 15/80; G06T 3/403; G06T 5/001; G06T 11/001
USPC .......................................... 345/606–610, 639
See application file for complete search history.

(56) References Cited

U.S. PATENT DOCUMENTS

| | | | |
|---|---|---|---|
| 5,083,297 A * | 1/1992 | Ostrander | 367/36 |
| 5,235,556 A * | 8/1993 | Monk et al. | 367/63 |
| 5,648,938 A * | 7/1997 | Jakubowicz | 367/56 |
| 6,564,176 B2 * | 5/2003 | Kadtke et al. | 702/189 |
| 6,691,039 B1 * | 2/2004 | Wood | 702/17 |
| 2006/0145695 A1 * | 7/2006 | Jericevic | 324/303 |

(Continued)

FOREIGN PATENT DOCUMENTS

WO    WO 2008152364 A1 * 12/2008

OTHER PUBLICATIONS

Sacchi et al.; 2005; Minimum weighted norm wavefield reconstruction for AVA imaging; Geophysical Prospecting, 2005, 53, 787-801.*

(Continued)

*Primary Examiner* — Todd Buttram
(74) *Attorney, Agent, or Firm* — ConocoPhillips Company

(57) ABSTRACT

A process for overcoming aliasing using a minimum weighted norm interpolation (MWNI) technique may include computing an initial, regularly interpolated model with no data gaps and computing a plurality of initial spectral weights using the initial, regularly interpolated model. The initial, regularly interpolated model is used to compute the spectral weights as initial constraints in a least-squares solution methodology. The initial spectral weights are used as initial constraints in a constrained minimum weighted norm interpolation data reconstruction. The process may further include converting the initial, regularly interpolated model into a frequency domain and computing unknown spectral weights from frequency data at each frequency slice of the initial, regularly interpolated model using Fourier transform. The process results in reducing aliasing artifacts and improving data regularization.

18 Claims, 8 Drawing Sheets

(56) References Cited

U.S. PATENT DOCUMENTS

2009/0180351 A1* 7/2009 Paffenholz et al. ............ 367/38
2009/0292476 A1* 11/2009 Abma ............................ 702/16

OTHER PUBLICATIONS

Liu, B and Sacchi, M, 2004, Simultaneous Interpolation of 4 Spatial Dimensions, SEG 74th annual meeting.

Liu, B, 2004, Multi-Dimensional Reconstruction of Seismic Data, Ph.D. Thesis, University of Alberta, Canada.

Naghizadeh, M, 2009, Parametric Reconstruction of Multi-Dimensional Seismic Records, Ph.D. Thesis, University of Alberta, Canada.

Trad, D., 2009, Five-dimensional Interpolation: Recovering from acquisition constraints, Geophysics, vol., 74, No. 6, p. v123-v132.

Cary, P. W., 2011, Aliasing and 5D Interpolation with the MWNI algorithm, SEG Annual Meeting.

Kreimer N., and Sacchi, M., 2011, 5D seismic volume reconstruction using HOSVD, EAEG, 73rd conference.

Abma, R., and Kabir, N., 2006, 3D interpolation of irregular data with a POCS algorithm, Geophysics, vol. 71, No. 6, P. E91-E97.

\* cited by examiner

MULTI-DIMENSIONAL DATA RECONSTRUCTION CONSTRAINED BY A REGULARLY INTERPOLATED MODEL

CROSS-REFERENCE TO RELATED APPLICATIONS

This application is a non-provisional application which claims benefit under 35 USC §119(e) to U.S. Provisional Application Ser. No. 61/640,508 filed Apr. 30, 2012, entitled "MULTI-DIMENSIONAL DATA RECONSTRUCTION CONSTRAINED BY A REGULARLY INTERPOLATED MODEL," which is incorporated herein in its entirety.

STATEMENT REGARDING FEDERALLY SPONSORED RESEARCH

None.

FIELD

This disclosure relates to processing data acquired in geophysical applications, and more specifically, to a method of reconstructing multi-dimensional data by using model constraints for interpolation and extrapolation of such multi-dimensional data before and during processing by a minimum weighted norm interpolation ("MWNI") technique.

BACKGROUND

Geophysicists and associated professionals desire regular or regularized data from subsurface geological surveys, such as seismic surveys, for use in geophysical applications in order to accurately produce images of subsurface geology. Examples of such geophysical applications that require regularized data may include amplitude analysis in offset domain, seismic migrations, and merging of various 3D subterranean surveys to gain visual profiles of subterranean formations. However, during data acquisition, acquisition geometries, equipment failures, economical limitations and field obstacles, such as caverns, rivers, buildings, etc. often result in collection of irregular data, which may include blanks or gaps (i.e. non-collection of regular data). FIG. 1 is an exemplary example to show the data gaps in a typical onshore field survey. Such gaps and irregular data may adversely affect construction of subsurface geological structures to be used in geophysical explorations.

Data interpolation may typically be performed to fill in gaps in the irregular data in an attempt to produce regular data. There are a number of interpolation algorithms available in the industry. Fourier-based interpolation algorithm is one of the most versatile approaches. It is relatively computationally fast, and easily extends to higher dimensions to obtain an optimal data reconstruction. Minimum Weighted Norm Interpolation (MWNI) belongs to this family of Fourier-based interpolation algorithms. Although MWNI is currently used in processing seismic surveys to interpolate for missing data and to produce regular data from otherwise irregular data, one fundamental limitation of an MWNI algorithm is that it cannot properly process spatially aliased data. One approach to address the issue of aliased data is to apply filtering in removing the aliased energy before the application MWNI interpolation. The filtering ensures that the data are not spatially aliased, but unfortunately it also degrades the interpolation result, especially causing the poor reconstruction of steeply dipping subsurface structures. Another approach to minimize the data aliasing issue involves two steps. The first step uses MWNI to interpolate missing data in the frequency ranges that are not spatially aliased. The second step uses predictor filters to interpolate the missing data in frequency ranges that are spatially aliased. The large data gaps and highly irregular data often cause the construction of the prediction filters to fail. The industry-standard technique to handle the data aliasing issue in MWNI employs a bootstrapping method to uses a lower-frequency solution to constrain a higher-frequency solution. This approach assumes that low frequency signals are unaliased and existed in the data. However, typical seismic acquisitions have difficulties to record low-frequency signals, particularly in the frequency range between 1 to 6 Hz. In addition, the higher-frequency solution becomes aliased when that frequency reaches into the aliased frequency range. The use of a lower-frequency solution to constrain a higher-frequency solution does not resolve the data aliased issue. At the present time, there is no viable option to overcome the aliased issue in the MWNI method.

What is needed is a method that addresses shortcomings related to use of an MWNI algorithm to handle spatial aliased data.

BRIEF SUMMARY OF THE DISCLOSURE

The teachings of the present disclosure includes a process for overcoming aliasing using a minimum weighted norm interpolation (MWNI) technique may include computing an initial, regularly interpolated model with no data gaps and computing a plurality of initial spectral weights using the initial, regularly interpolated model. The initial, regularly interpolated model is used to compute the spectral weights as initial constraints in a least-squares solution methodology. The initial spectral weights are used as initial constraints in a constrained minimum weighted norm interpolation data reconstruction. The process may further include converting the initial, regularly interpolated model into a frequency domain and computing unknown spectral weights from frequency data at each frequency slice of the initial, regularly interpolated model using Fourier transform. The process results in reducing aliasing artifacts and improving data regularization.

In one embodiment, a process is described for overcoming aliasing in a minimum weighted norm interpolation (MWNI) technique, where an initial, regularly interpolated model computed; and a plurality of initial spectral weights are computed using the initial, regularly interpolated model. The process may use initial spectral weights as initial constraints in a constrained minimum weighted norm interpolation data reconstruction.

Additionally, the initial, regularly interpolated model may include computing the initial, regularly interpolated model with no data gaps; converting the initial, regularly interpolated model into a frequency domain; and computing unknown spectral weights from frequency data at each frequency slice of the initial, regularly interpolated model using Fourier transform; computing spectral weights Pk using the initial, regularly interpolated model is not limited to the use of Fourier transform, but other techniques can be used to estimate the spectral weights; or converting the initial, regularly interpolated model into a frequency domain.

The initial, regularly interpolated model may also include computing unknown spectral weights Pk in $x'=|(THT+\mu F-1|Pk|-2F)-1$ THd, from frequency data at each frequency slice of the initial, regularly interpolated model using Fourier transform, wherein $\mu$ is a weighing factor controlling tradeoff between model norm and misfit of observations, H is a conjugate transpose operator, xH is a conjugate transpose of x, F is a multi-dimensional forward Fourier transform, F−1 is a multi-dimensional inverse Fourier transform, and x' is a least-squared solution with a minimum weighted norm (MWNI) to recover missing data; computing the initial, regularly interpolated model and computing a plurality of initial spectral weights using the initial, regularly interpolated model is not a bootstrapping method that utilizes a lower-frequency solution to constrain a higher-frequency solution; utilizing a frequency from a plurality of frequencies of the initial, regularly interpolated model to constrain a solution at the frequency; computing a plurality of initial spectral weights using the initial, regularly interpolated model is either single dimensional or multi-dimensional.

In another embodiment, the constrained minimum weighted norm interpolation data reconstruction may be multi-dimensional. Computing the initial, regularly interpolated model may not require accurate matching of its true model counterpart. Computing the initial, regularly interpolated model may be a one dimensional linear interpolation along a number of dominant dipping events. Computing the initial, regularly interpolated model may be a one-dimensional or two-dimensional model. Computing the initial, regularly interpolated model may use a Radon interpolation, a Tau-P interpolation, a higher-order singular value decomposition, or a convex projections algorithm.

An accurate initial, regularly interpolated model may not be required, the accurate initial, regularly interpolated model may be either an accurate data model representation or an approximate data model representation of a true, available data model. Additionally, frequency contents of the initial, regularly interpolated model do not require a full data bandwidth as available data, but frequency contents of the initial model can be band-limited.

These variations make this MWNI method very robust and it may be implemented with a variety of initial models, frequency contents, and interpolations.

BRIEF DESCRIPTION OF THE DRAWINGS

A more complete understanding of the present disclosure and benefits thereof may be acquired by referring to the following description taken in conjunction with the accompanying Figures, in which.

DETAILED DESCRIPTION

Turning now to the detailed description of the preferred arrangements of the present disclosure and their effects, as presented with this description and FIGS. 2-15, inventive features and concepts may be manifest in alternative arrangements. The scope of the disclosure is not limited to the embodiments described or depicted.

In accordance with the present teachings, a Minimum Weighted Norm Interpolation (MWNI) algorithm with model constraints is defined using the following equations. The complete unknown data "x" and available incomplete data "d" are related such that Tx=d, where T is a multi-dimensional sampling matrix. The entry of this sampling matrix is one (1) when a spatial recording location contains a measurement; otherwise, the entry of this sampling matrix is zero (0) when a spatial recording location does not contain a measurement or missing data.

The complete unknown data x, frequency by frequency, can be reconstructed by minimizing the following cost function J, where:

$$J = \|Tx - d\|^2 + \mu x^H F^{-1} |P_k|^{-2} Fx,$$

and the least-squares solution with a minimum weighted norm of $\mu x^H F^{-1} |P_k|^{-2} Fx$ is:

$$x' = (T^H T + \mu F^{-1} |P_k|^{-2} F)^{-1} T^H d, \quad \text{Equation 1}$$

where:

$\mu$ is a weighing factor controlling the tradeoff between the model norm and misfit of observations, H is a conjugate transpose operator, $x^H$ is a conjugate transpose of x, F is a multi-dimensional forward Fourier transform, $F^{-1}$ is a multi-dimensional inverse Fourier transform, and x' is a least-squares solution with a minimum weighted norm (MWNI) to recover missing data.

$|P_k|^{-2}$ represents the spectral weights in frequency and wavenumber domains on the fully sampled multi-dimensional unknown seismic data x. Since the available data (d) have missing seismic data, spectral weights can not be computed and are typically unknown. A process in accordance with the teachings of the present disclosure may involve constructing a fully interpolated multi-dimensional initial model from available data, and then employing the resulting regular model to compute spectral weights, $P_k$, as the initial constraints in a least-squares solution, such as in accordance with equation 1. The constraints derived from this fully reconstructed model significantly reduce spatial aliasing artifacts and produce regularized data that is well-prepared for processing and improved over prior techniques. The data or frequency contents of the initial model may be full data bandwidth or band-limited data. As an exemplary example, the frequency contents of available data or field data ranges from 1 to 125 Hz. The frequency contents of the initial model may have the same bandwidth as the field data ranging from 1 to 125 Hz. Alternatively, the frequency content of the initial model may be band-limited from 5 to 90 Hz, depending on the geological exploration objectives.

Figure 1:
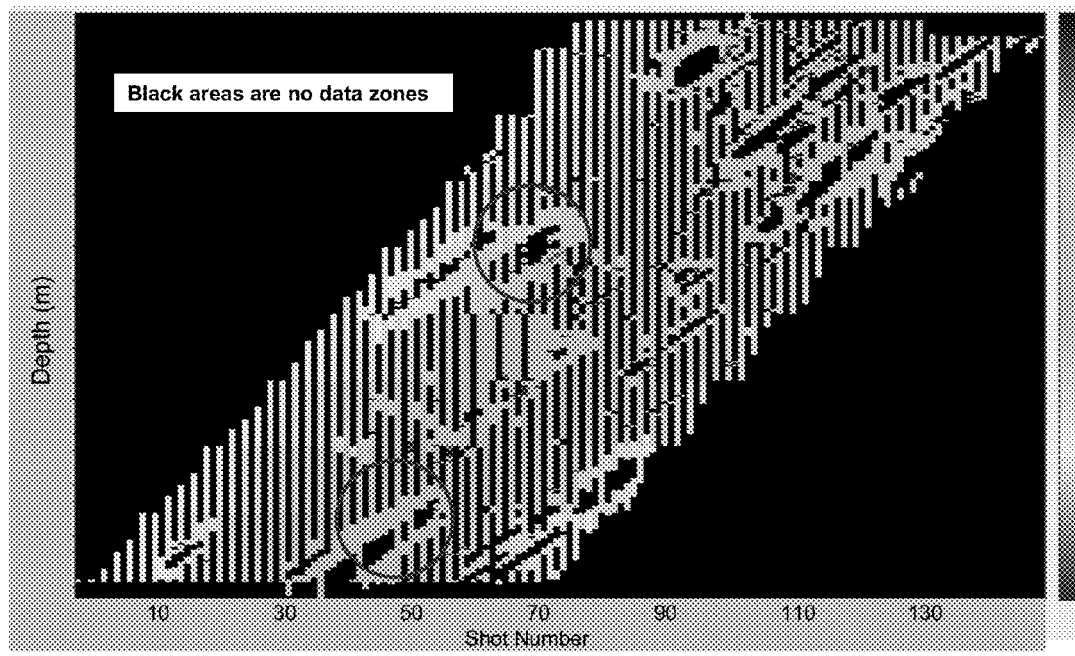
FIG. 1 is an example fold map of five-dimensional field data depicted at a geographic location including data measurements and data gaps, which are located between data measurements and are black or relatively dark areas representing missing or no data.
Figure 2:
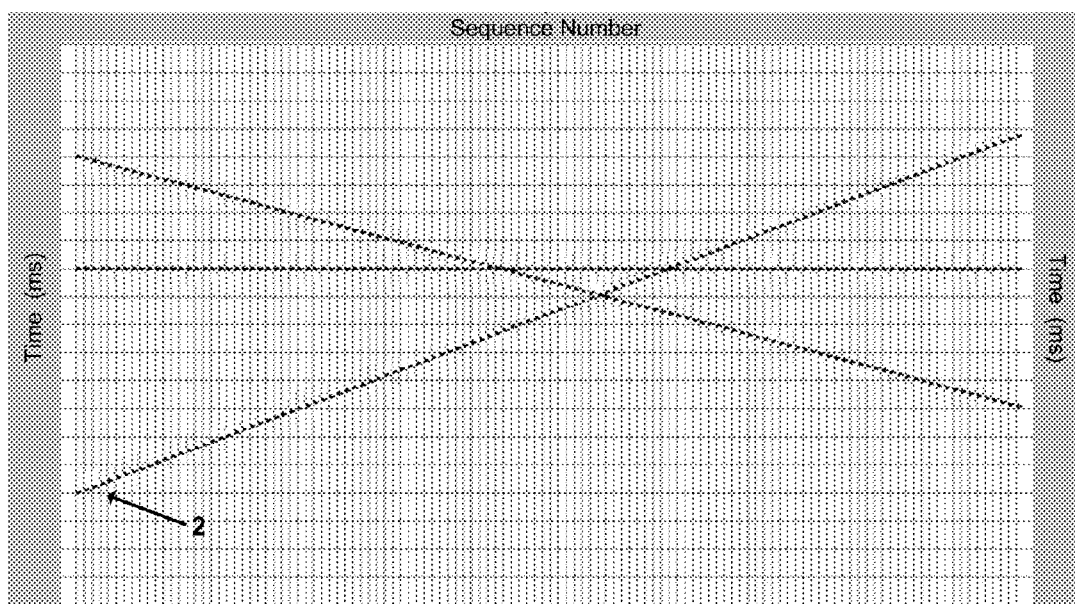
FIG. 2 is a plot of ideal 2D synthetic data without missing data.
Figure 3:
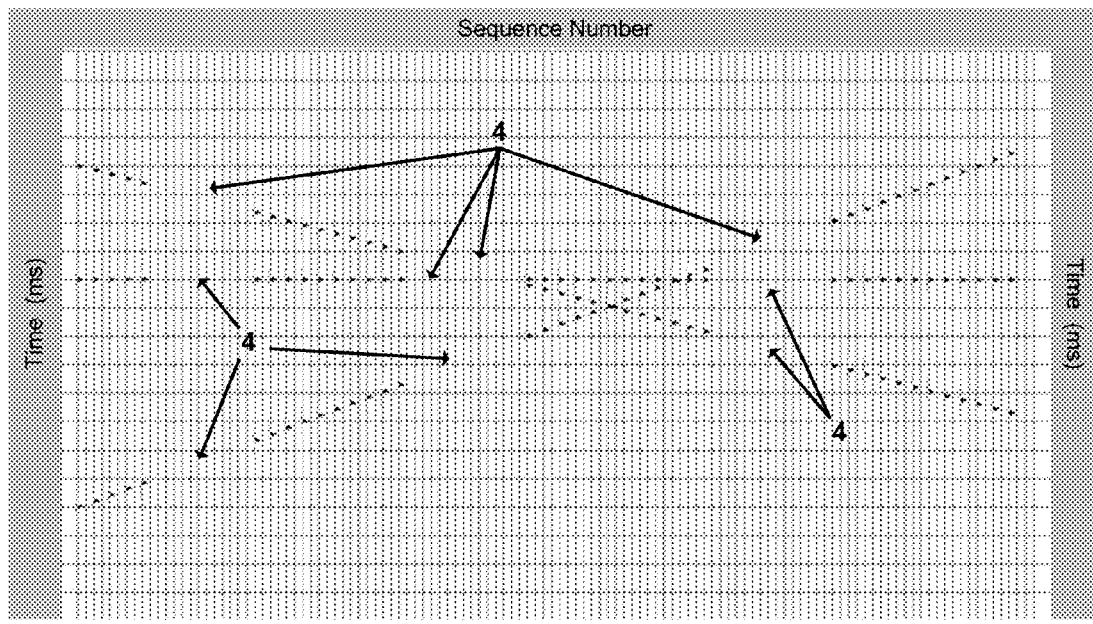
FIG. 3 is a plot of decimated 2D synthetic data with various data gaps to be used for MWNI interpolation in accordance with the present disclosure.

Steps involved in constructing an initial, regularly interpolated model may include, but may not be limited to: for a given spatial dimension of the multi-dimensional data, the missing data may be interpolated along a number of dominant dipping events 2, as depicted in FIG. 2. This procedure is repeated for all spatial dimensions to reconstruct a fully regular, multi-dimensional model. Other methods such as radon interpolation, tau-p interpolation, or other more accurate multi-dimensional interpolation techniques such as higher-order singular value decomposition (SVD) and projection onto a convex sets algorithm may be used to construct an approximate initial model.

Figure 4:
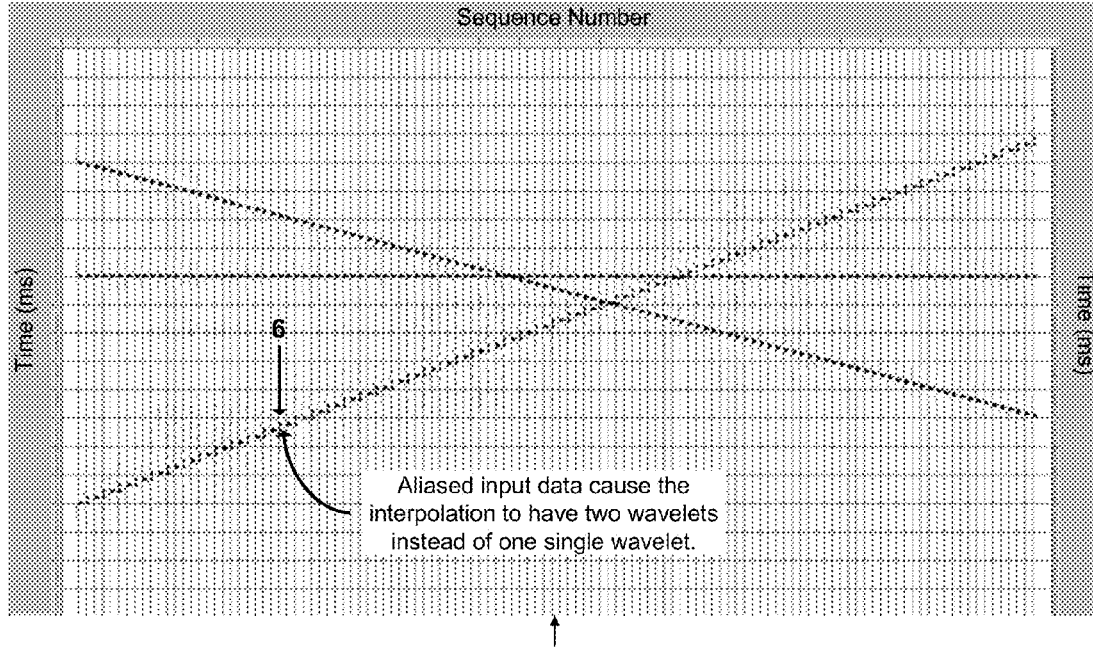
FIG. 4 is a plot of industry-standard Minimum Weighted Norm Interpolation data depicting aliased data in accordance with the prior art.

The teachings of the present disclosure also possess the benefit of and recognize that the initial spectral weights do not require an accurately computed model, but only an approximate model. The use of an approximate model greatly simplifies construction of an initial, regularly interpolated model from available data, yet still overcomes the limitation of double wavelets 6 imposed by aliasing, as depicted in FIG. 4.

Figure 5:
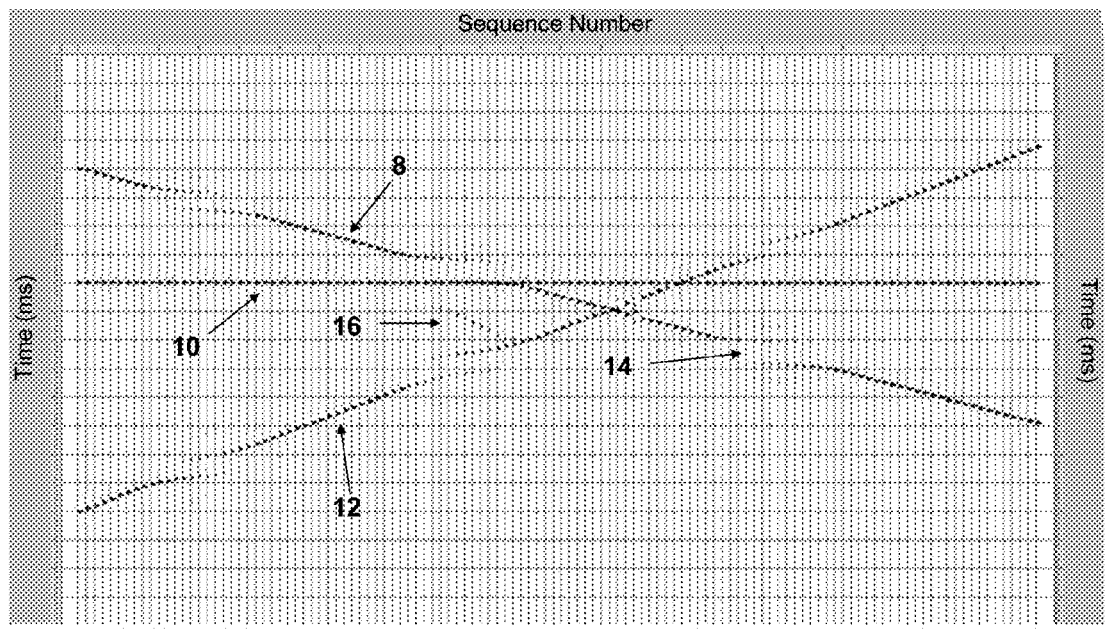
FIG. 5 is a plot of an initial model of fully interpolated data in accordance with the present disclosure.
Figure 6:
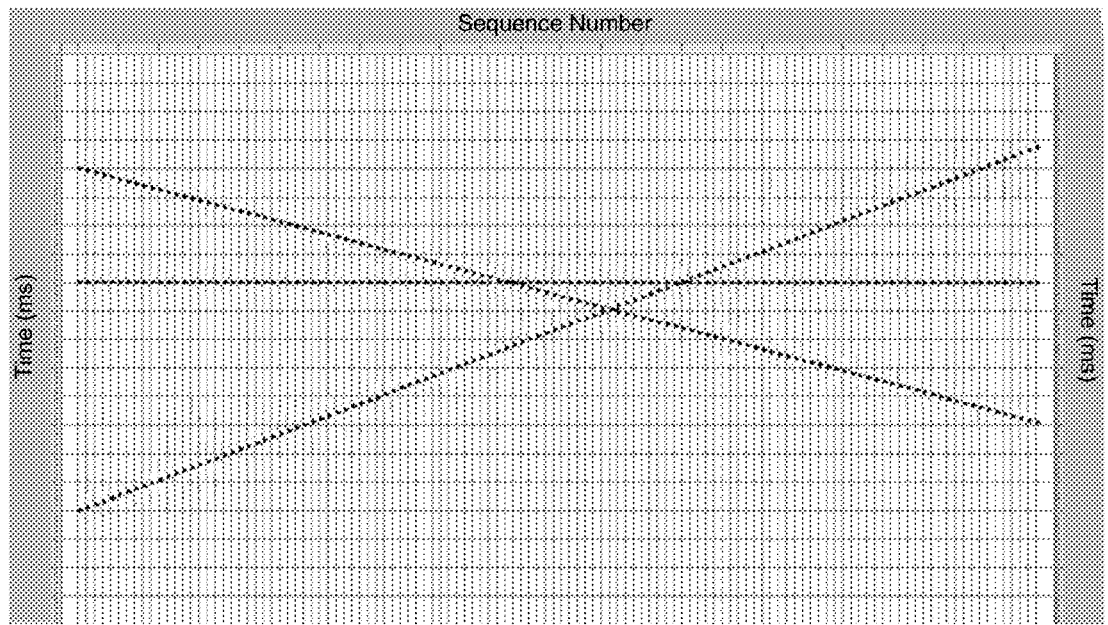
FIG. 6 is a plot of Minimum Weighted Norm Interpolation data in accordance with the present disclosure.

As an example to demonstrate how teachings of the present disclosure operate to handle aliased data, an example synthetic data set was created to compare the interpolated results between the known industry standard MWNI and teachings of the present disclosure, which may be referred to as MWNI with model constraints. Since FIG. 2 depicts an example of an ideal synthetic data set with no missing data, the data set of FIG. 2 was decimated with various data gaps to simulate missing field data, as depicted by data gaps 4 in FIG. 3. The known industry standard MWNI can not properly interpolate aliased input data because aliased input data causes interpolation to result in multiple wavelets 6 as depicted in FIG. 4 instead of one single wavelet. In order to correct or compensate for aliased data, a first step in a process of the teachings of the present disclosure may involve constructing an initial, regularly interpolated model as depicted in FIG. 5, which may deviate considerably from the true or ideal data model. FIG. 5 depicts an exemplary example to illustrate that the initial model lines 8, 10 12 or plots deviate from and are not close to the lines or plots of the ideal data depicted in FIG. 2. In other words, lines 8, 10, 12 have data gaps 14 and data variations 16 that result in non-linearity, of lines 8, 10, 12, for example. However, the initial model of FIG. 5 may be used to provide initial constraints to MWNI in accordance with teachings of the present disclosure. The interpolated result using teachings of the present disclosure properly recovers the missing data gaps, including the input data which are spatially aliased, resulting in a time domain plot as depicted in FIG. 6. Another way to visualize how the teachings of the present disclosure overcome and correct for aliased data is to examine the interpolated results in both, frequency and wavenumber domains of this synthetic data example.

Figure 7:
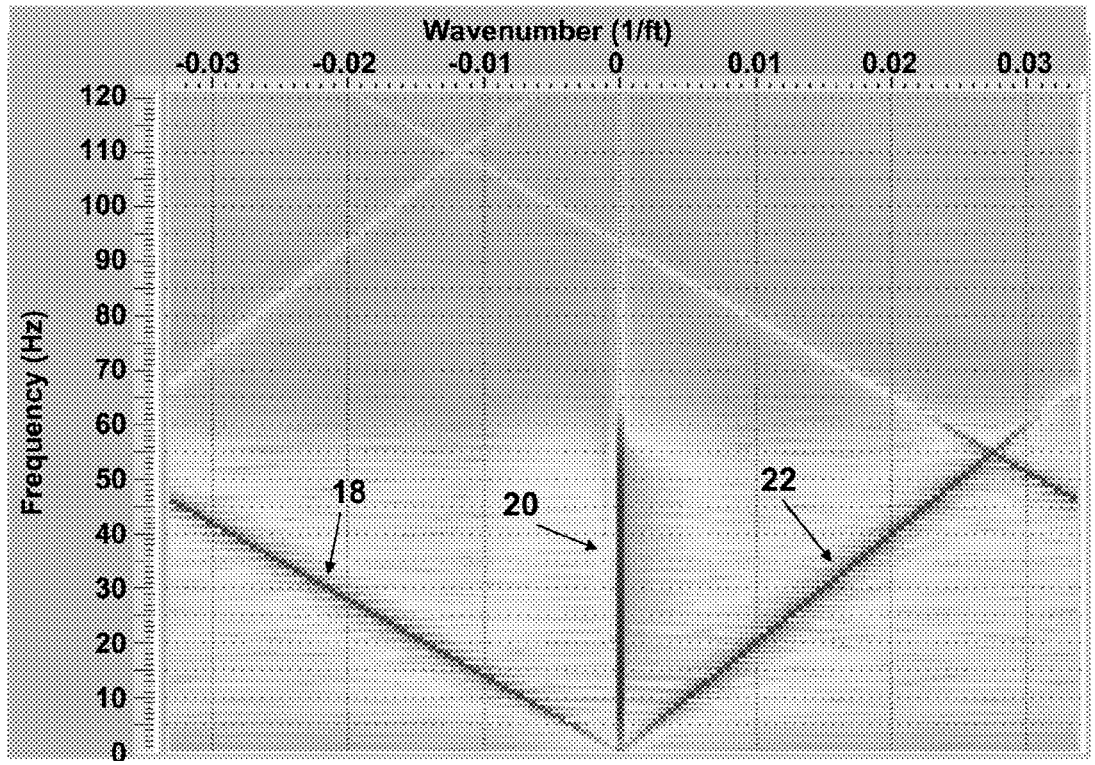
FIG. 7 is a spectrum plot of frequency versus wavenumber in a case of ideal synthetic data.
Figure 8:
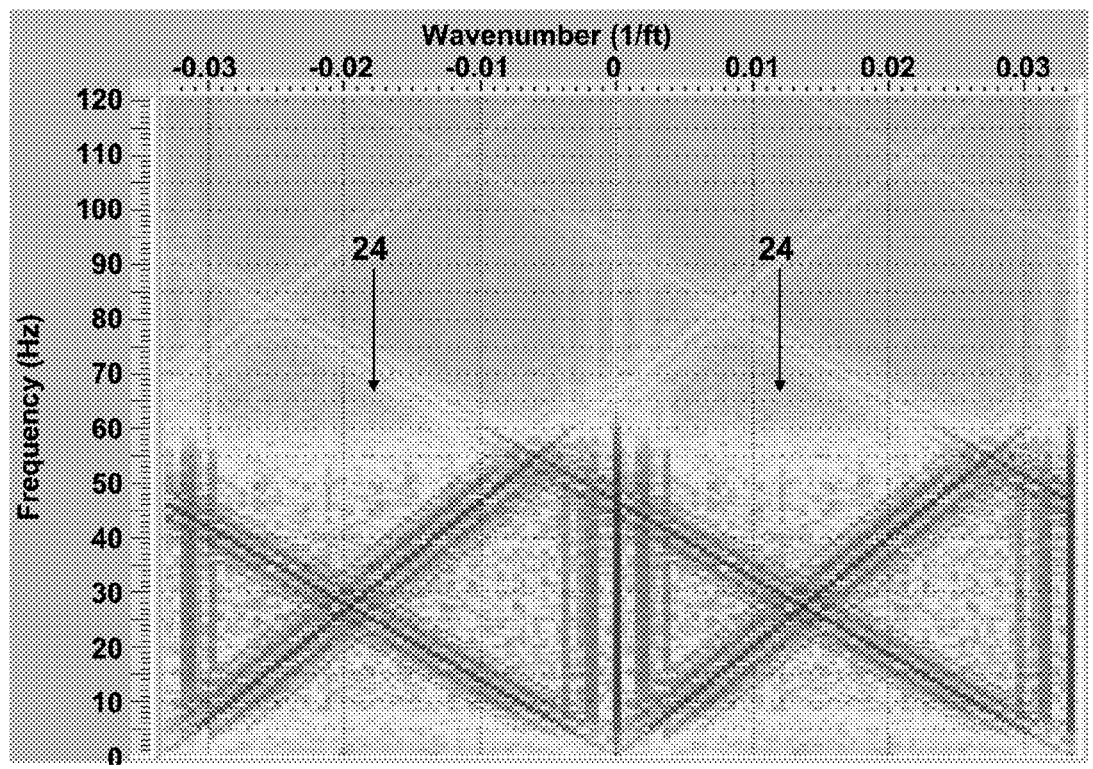
FIG. 8 is a spectrum plot of frequency versus wavenumber in a case of decimated synthetic data.
Figure 9:
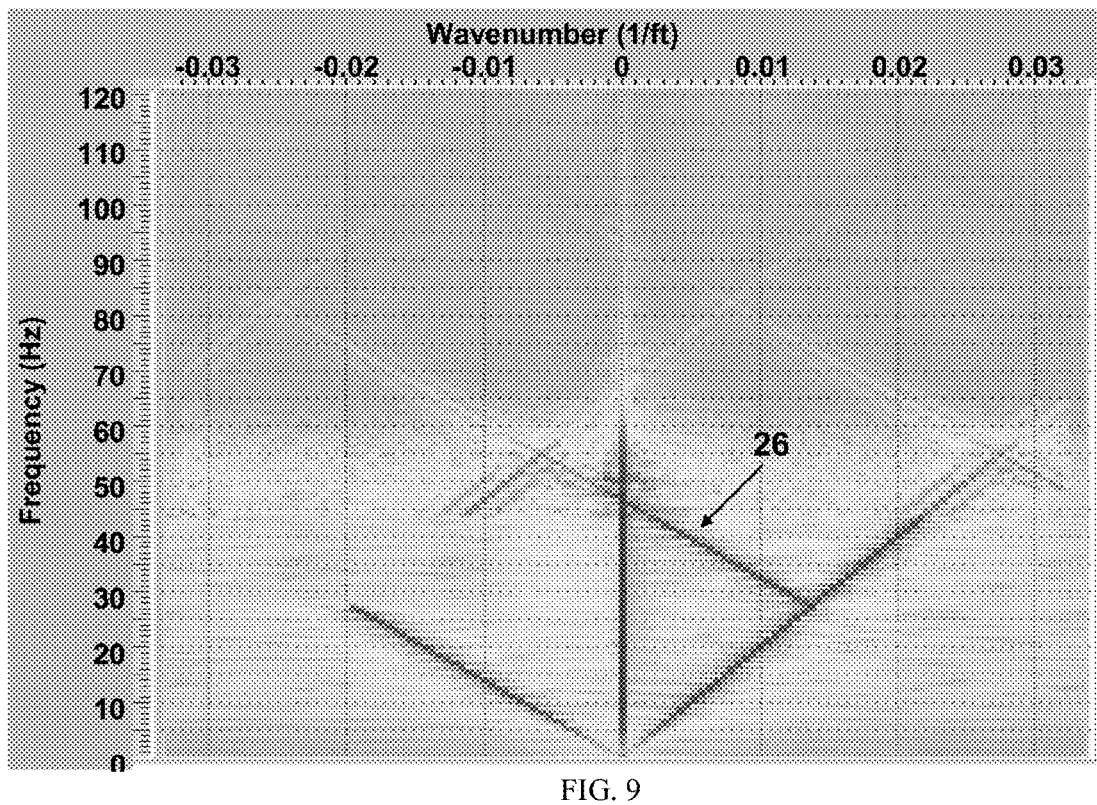
FIG. 9 is a spectrum plot of frequency versus wavenumber of Minimum Weighted Norm Interpolation data depicting aliased data at an incorrect spatial location, in accordance with the prior art.
Figure 10:
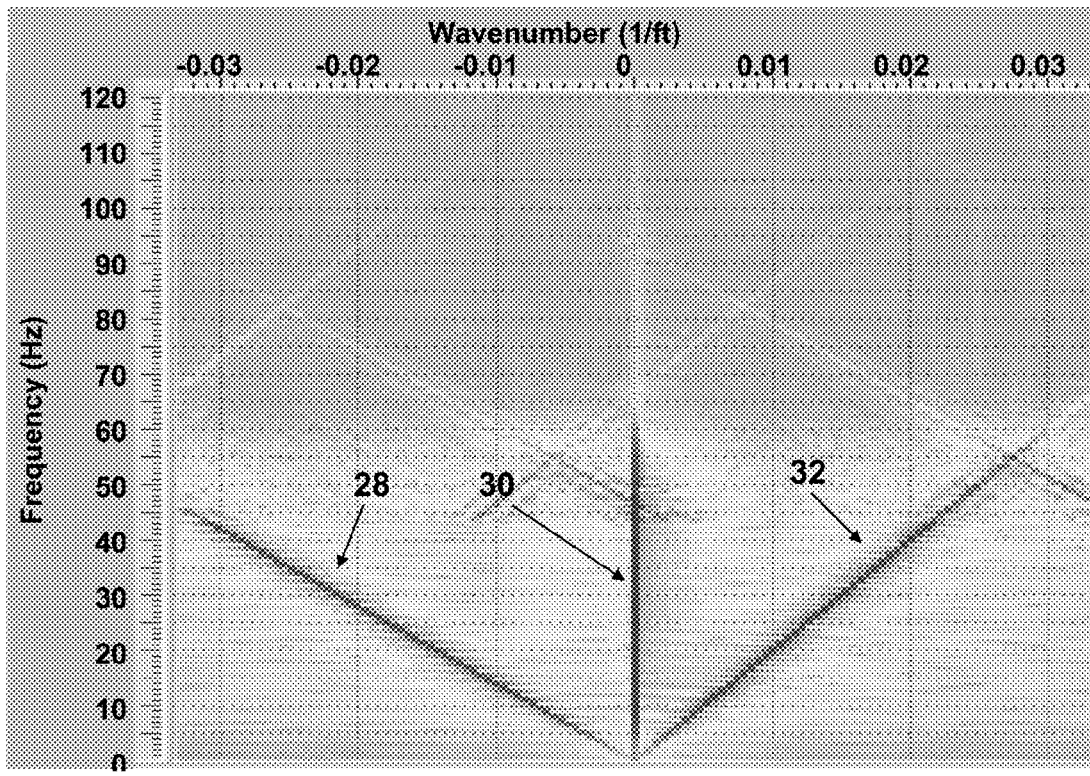
FIG. 10 is a spectrum plot of frequency versus wavenumber of Minimum Weighted Norm Interpolation data, in accordance with the present disclosure.

FIG. 7 depicts a spectrum of ideal data in frequency and wavenumber domains by showing three distinct linear events 18, 20, 22. However, the spectrum of decimated data of FIG. 8 exhibits a pattern 24 that is duplicated or repeated twice in which linear events intersect or cross each other. Such repeated patterns of event crossing are caused by aliased data. FIG. 9 depicts a spectrum in accordance with the industry standard MWNI that does not adequately nor properly process aliased data, and thus does not properly display aliased data as depicted with area or line 26. Such inadequate processing leads to incorrect plotting of subterranean formations or at least misinterpretation of such plots which leads to improper decisions, wasted resources and time. When area or line 26 of FIG. 9 is compared with the ideal spectrum example of FIG. 7, such area or line 26 is not present in FIG. 7. In accordance with teachings of the present disclosure, FIG. 10 depicts a spectrum such that plots or lines 28, 30, 32 in which no extra line or area of plotting results. Moreover, FIG. 10 with plots or lines 28, 30, 32 matches a spectrum of the desired or ideal data having plots or lines 18, 20, 22 depicted in FIG. 7, remarkably well.

Figure 11:
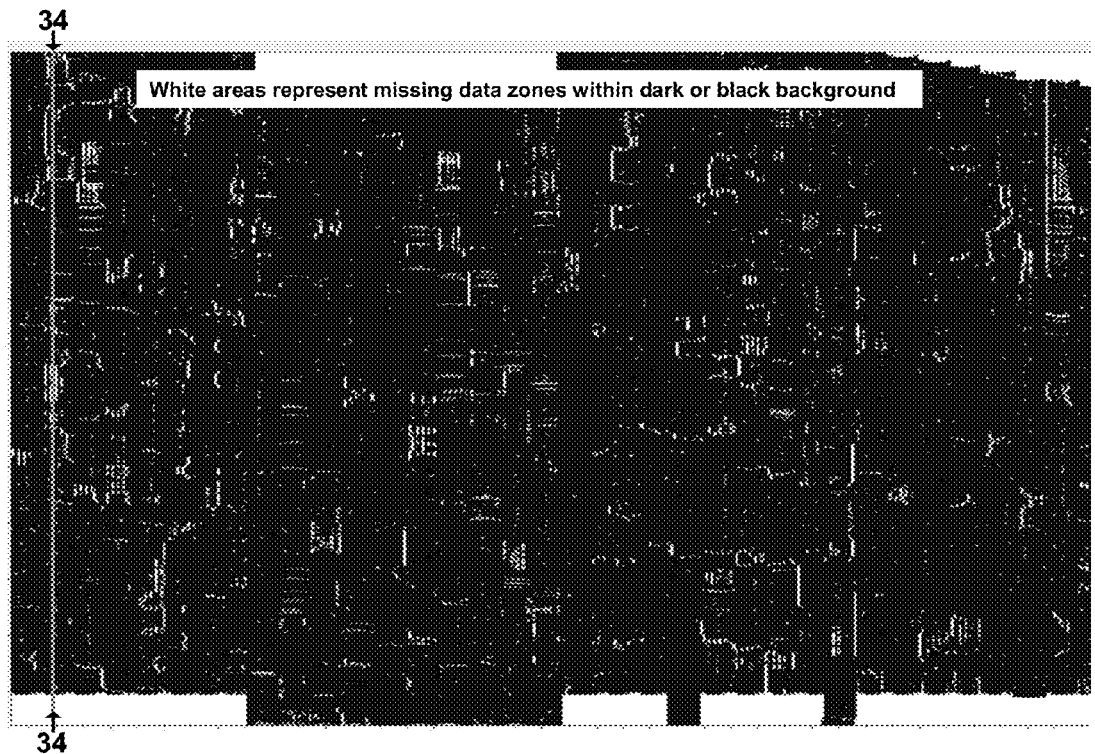
FIG. 11 is a three-dimensional common-offset fold map example depicting data gaps in a field data set.
Figure 12:
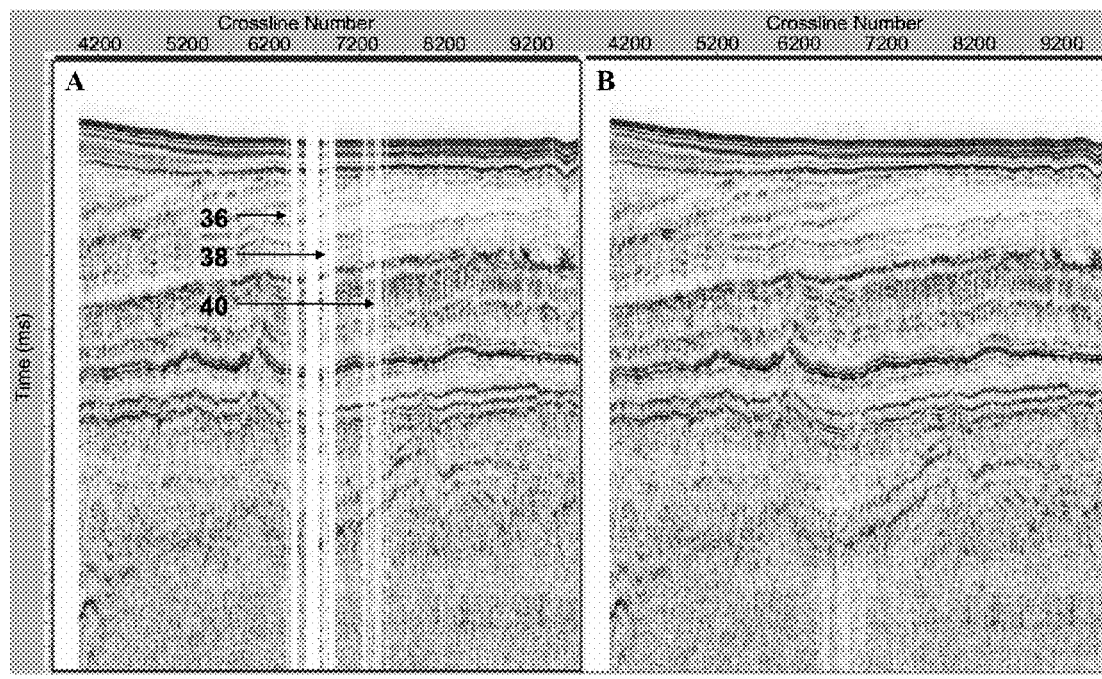
FIG. 12A is a three-dimensional field data example before interpolation depicting data gaps.
FIG. 12B is the same three-dimensional field data example of FIG. 12A, but after interpolation in accordance with the present disclosure.
Figure 13:
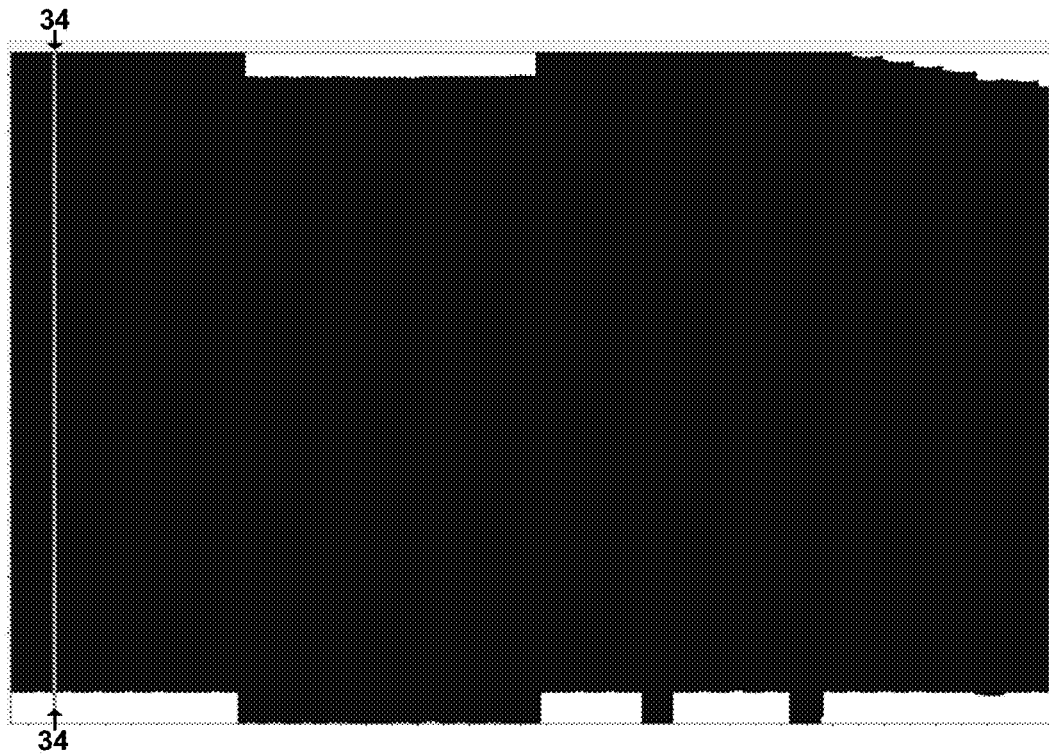
FIG. 13 is a three-dimensional common-offset fold map depicting no data gaps in accordance with the present disclosure.
Figure 14:
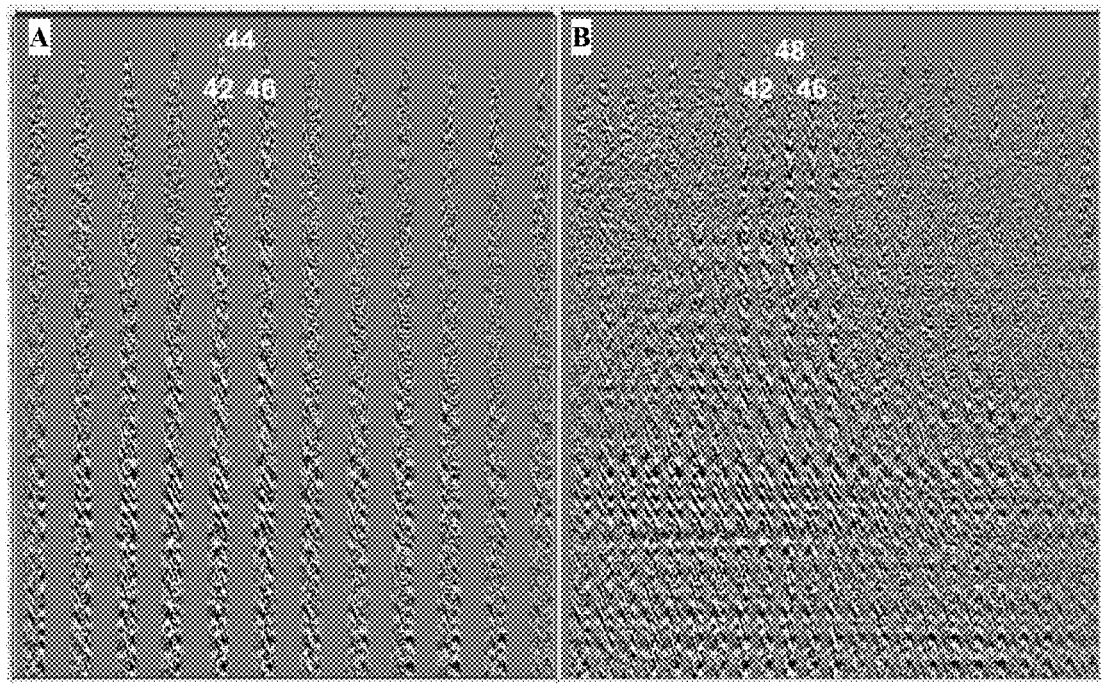
FIG. 14A is a five-dimensional field data example before interpolation depicting how a data gap area exists between adjacent data areas of original, irregular field seismic data.
FIG. 14B is a five-dimensional field data example after interpolation depicting recovery of missing data of an example area, in accordance with the present disclosure.

Three-dimensional (3D) and five-dimensional (5D) field data examples may be used to further illustrate how teachings of the present disclosure work in practice. As discussed above, FIG. 11 depicts a 3D common offset fold map with a vertical axis label of crossline number and a horizontal axis label of inline number and represents the number of measurements at each crossline-inline location. The white, gray or lightest areas represent that there is no measurements or missing data in that location. Conversely, the darkest areas represent that data collection has occurred for that area. There may be various types of data gaps in the collected field data. As an exemplary 3D example, FIG. 11 depicts a vertical line 34 which is a seismic section of the inline profile 1818 that was examined before and after application of MWNI in conjunction with the teachings of the present disclosure. FIG. 12A depicts the original available data of inline 1818 profile with various exemplary data gaps 36, 38, 40 before utilizing MWNI constrained by a regularly interpolated model in accordance with the teachings of the present disclosure. After utilizing MWNI constrained by a regularly interpolated model in accordance with the teachings of the present disclosure, the reconstruction of the complex structures where previously there were missing data gaps 36, 38, 40 is successfully completed and exhibited, as depicted in FIG. 12B, as data gaps 36, 38, 40 are not present. Moreover, FIG. 13, which is a fold map of the reconstructed data (dark or black areas) utilizing MWNI along with the teachings of the present disclosure, depicts that all missing data gaps were fully interpolated. In FIG. 13, any missing data gaps would be represented by light or white areas. FIGS. 14A and 14B depict an exemplary 5D example. FIG. 14A depicts the original available data of a seismic profile, and FIG. 14B depicts the same profile after applying MWNI constrained by a regularly interpolated model in accordance with the teachings of the present disclosure, which depicts the recovering of missing data. For instance, data gap 44 between data band 42 and data band 46 has been largely reconstructed or completed such that data gap 44 of FIG. 14A, becomes a data zone 48 in FIG. 14B.

Figure 15:
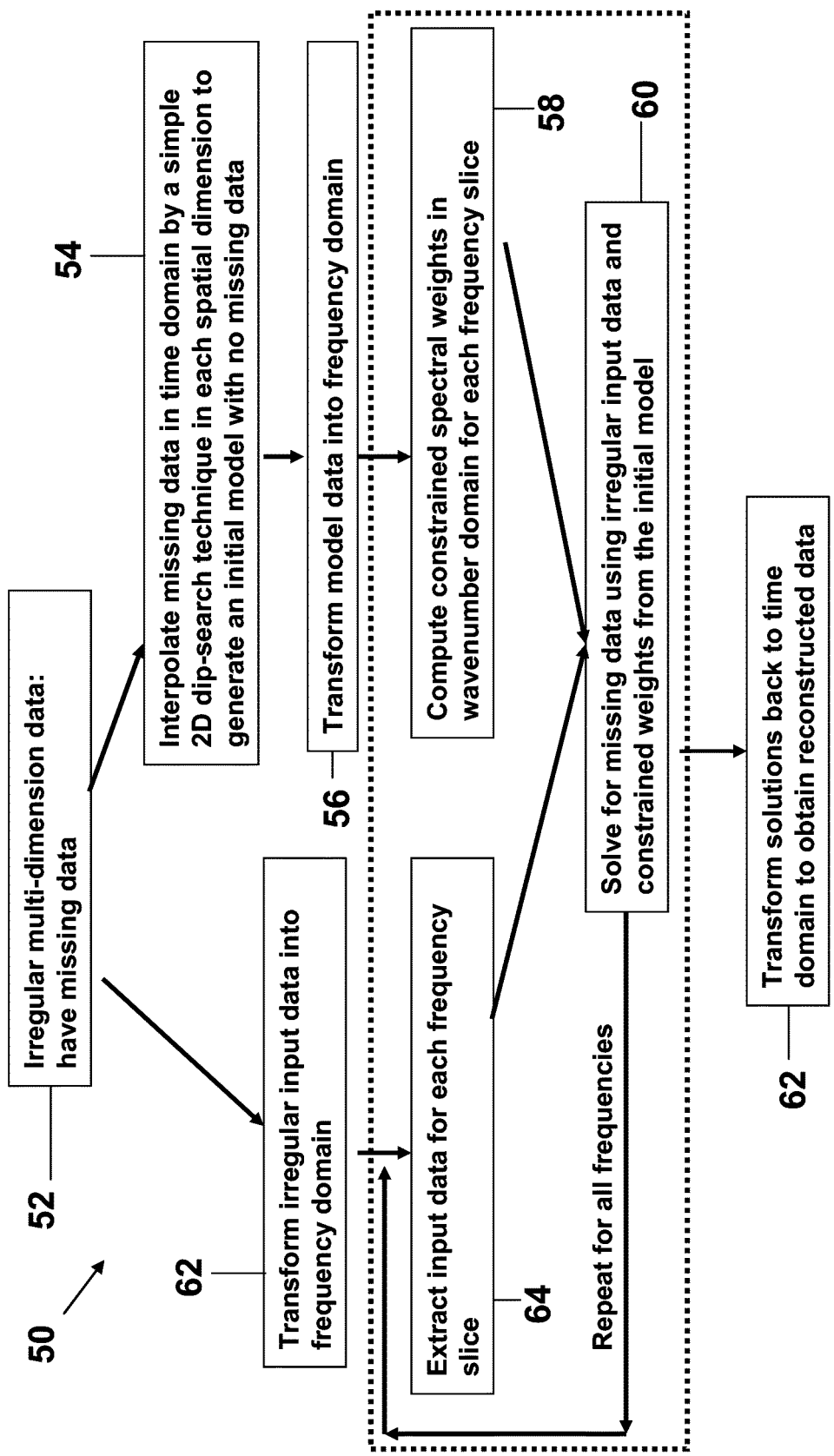
FIG. 15 is a flowchart depicting example steps in a multi-dimensional MWNI interpolation with model constraints in accordance with the present disclosure.

Teachings of the present disclosure include a process, steps of which are depicted in flowchart 50 of FIG. 15. Additional and intermediary steps are conceivable. FIG. 15 depicts a process employing multi-dimensional minimum weighted norm interpolation with model constraints. In flowchart 50, irregular multi-dimensioned data is identified at step 52. Such irregular multi-dimension data may present itself as gaps or vacancies in recorded data from a geological seismic survey, as explained above. Upon identifying irregular multi-dimension data, the process of flowchart 50 may flow to block 54 where interpolating missing data in a time domain by a two-dimensional (2D) dip search technique in each spatial dimension to generate an initial model with no missing data may occur. That is, data gaps, which are missing data zones, are accounted for with data arrived at or calculated from the interpolation process.

Upon interpolating missing data at block 54, the process may proceed to step 56 where data from the initial, regularly interpolated model of step 54 is transformed or converted to the frequency domain. Upon transformation of the model data into the frequency domain, the process flows to step 58 where constrained spectral weights, $P_k$, are computed in a wavenumber domain for each frequency slice (i.e. each frequency) using a multi-dimension Fourier transform. Upon computing constrained spectral weights in a wavenumber domain for each frequency slice at step 58, the process combines with another process flow (e.g. upon step 58 being completed, the process may wait for other process steps to be performed before flowing to step 60 or other process steps may be simultaneously performed and the combined when the process flow proceeds to step 60).

The second process flow from block 52 proceeds to step 62 where the irregular input data may be transformed into a frequency domain. Upon the irregular input data being transformed into a frequency domain, the process may flow to step 64, where input data for each frequency slice is extracted. Upon extraction of input data for each frequency slice at step 64, the process proceeds to step 60 where solving for missing data is accomplished by using irregular input data and constrained weights, $P_k$, from the initial model. Step 60 is where computing and utilization of Equation 1 occurs. More specifically, the solution of the missing data is solved by a least-squares solution, frequency by frequency. As depicted in flowchart 50 of FIG. 15, steps 64, 58, and step 60 are then repeated in an iterative loop for each frequency slice until each frequency slice (i.e. all frequencies) has been exhausted. Upon exhaustion of all frequency slices, the process proceeds from step 60 to step 62 where all solutions are transformed back into the time domain by a Fourier transform to create the reconstructed data.

A component of the teachings of the present disclosure recognizes that the initial spectral weights may not require an accurately computed model, but only an approximate model. The use of an approximate model simplifies construction of an initial, regularly interpolated model from available data, yet overcomes limitations imposed by aliasing.

Thus, an initial, regularly interpolated model in the time domain is constructed in which there is no missing data. Such an initial model is used in the frequency-wavenumber domain to constrain the least squares solution. Such an approach significantly reduces aliasing artifacts as opposed to traditional MWNI techniques, which are incapable of interpolating aliased data. Another advantage of the present disclosure is that an accurately computed model is not necessarily required; only an approximate model need be created. Accordingly, use of an approximate model greatly simplifies construction of an initial model from available data, yet overcomes limitations imposed by aliasing of data.

In closing, it should be noted that the discussion of any reference is not an admission that it is prior art to the present disclosure, especially any reference that may have a publication date after the priority date of this application. At the same time, each and every claim below is hereby incorporated into this detailed description or specification as additional embodiments of the present disclosure.

Although the systems and processes described herein have been described in detail, it should be understood that various changes, substitutions, and alterations can be made without departing from the spirit and scope of the disclosure as defined by the following claims. Those skilled in the art may be able to study the preferred embodiments and identify other ways to practice the disclosure that are not exactly as described herein. It is the intent of the inventors that variations and equivalents of the disclosure are within the scope of the claims. The description, abstract and drawings are not to be used to limit the scope of the disclosure, which is intended to be as broad as the claims below and their equivalents.

REFERENCES

All of the references cited herein are expressly incorporated by reference. The discussion of any reference is not an admission that it is prior art to the present disclosure, especially any reference that may have a publication data after the priority date of this application. Incorporated references are listed again here for convenience:
1. Liu, B and Sacchi, M, 2004, Simultaneous Interpolation of 4 Spatial Dimensions, SEG 74th annual meeting.
2. Liu, B, 2004, Multi-Dimensional Reconstruction of Seismic Data, Ph.D. Thesis, University of Alberta, Canada.
3. Naghizadeh, M, 2009, Parametric Reconstruction of Multi-Dimensional Seismic Records, Ph.D. Thesis, University of Alberta, Canada.
4. Trad, D., 2009, Five-dimensional Interpolation: Recovering from acquisition constraints, Geophysics, Vol., 74, No. 6, P. v123-v132.
5. Cary, P. W., 2011, Aliasing and 5D Interpolation with the MWNI algorithm, SEG Annual Meeting.
6. Kreimer N., and Sacchi, M., 2011, 5D seismic volume reconstruction using HOSVD, EAEG, $73^{rd}$ conference.
7. Abma, R., and Kabir, N., 2006, 3D interpolation of irregular data with a POCS algorithm, Geophysics, Vol., 71, No. 6, P. E91-E97.

The invention claimed is:
1. A process for overcoming aliasing in a minimum weighted norm interpolation (MWNI) technique, the process comprising:
    computing, by a processor, an initial, regularly interpolated model;
    computing a plurality of initial spectral weights using the initial, regularly interpolated model;
    converting the initial, regularly interpolated model into a frequency domain, and, unknown spectral weights $P_k$ in $x'=|(T^H T + \mu F^{-1}|P_k|^{-2}F)^{-1}T^H d$, a from frequency data at each frequency slice of the initial, regularly interpolated model using Fourier transform, wherein $\mu$ is a weighing factor controlling tradeoff between model norm and misfit of observations, H is a conjugate transpose operator, $x^H$ is a conjugate transpose of x, F is a multi-dimensional forward Fourier transform, $F^{-1}$ is a multi-dimensional inverse Fourier transform, and x' is a least-squared solution with a minimum weighted norm (MWNI) to recover missing data; wherein the process results in reducing aliasing artifacts and improving reconstruction of multi-dimensional data regularization from otherwise irregular data.
2. The process of claim 1, further comprising:
    using initial spectral weights as initial constraints in a constrained minimum weighted norm interpolation data reconstruction.

3. The process of claim 1, wherein computing the initial, regularly interpolated model further comprises computing, the initial, regularly interpolated model with no data gaps.

4. The process of claim 1, further comprising:
converting the initial, regularly interpolated model into a frequency domain; and computing unknown spectral weights from frequency data at each frequency slice of the initial, regularly interpolated model using Fourier transform.

5. The process of claim 1, wherein computing, the initial, regularly interpolated model and computing a plurality of initial spectral weights using the initial, regularly interpolated model is not a bootstrapping method that utilizes a lower-frequency solution to constrain a higher-frequency solution.

6. The process of claim 1, further comprising utilizing a frequency from a plurality of frequencies of the initial, regularly interpolated model to constrain a solution at the frequency.

7. The process of claim 1, wherein computing a plurality of initial spectral weights using the initial, regularly interpolated model is either single dimensional or multi-dimensional.

8. The process of claim 2, wherein the constrained minimum weighted norm interpolation data reconstruction is multi-dimensional.

9. The process of claim 1, wherein computing the initial, regularly interpolated model does not require accurate matching of its true model counterpart.

10. The process of claim 1, wherein computing the initial, regularly interpolated model is a one dimensional linear interpolation along a number of dominant dipping events.

11. The process of claim 1, wherein computing the initial, regularly interpolated model is a one-dimensional or two-dimensional model.

12. The process of claim 1, wherein computing the initial, regularly interpolated model further comprises utilizing a Radon interpolation.

13. The process of claim 1, wherein computing the initial, regularly interpolated model further comprises utilizing a Tau-P interpolation.

14. The process of claim 1, wherein computing the initial, regularly interpolated model further comprises utilizing a higher-order singular value decomposition.

15. The process of claim 1, wherein computing the initial, regularly interpolated model further comprises utilizing a convex projections algorithm.

16. The process of claim 1, wherein an accurate initial, regularly interpolated model is not a requirement.

17. The process of claim 1, wherein accurate initial, regularly interpolated model is either an accurate data model representation or an approximate data model representation of a true, available data model.

18. The process of claim 1, wherein frequency contents of the initial, regularly interpolated model are not limited to have a full data bandwidth as available data, but frequency contents of the initial model can be band-limited.

\* \* \* \* \*